(12) United States Patent
Sasaki

(10) Patent No.: US 6,637,951 B2
(45) Date of Patent: Oct. 28, 2003

(54) LENS DEVICE

(75) Inventor: Ryuta Sasaki, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/086,523

(22) Filed: Mar. 4, 2002

(65) Prior Publication Data

US 2002/0141752 A1 Oct. 3, 2002

(30) Foreign Application Priority Data

Mar. 5, 2001 (JP) ........................ 2001-060265

(51) Int. Cl.[7] .................................................. G03B 5/02
(52) U.S. Cl. ...................................................... 396/349
(58) Field of Search ................................. 396/349, 348, 396/72, 73, 74

(56) References Cited

U.S. PATENT DOCUMENTS

| | | | | |
|---|---|---|---|---|
| 6,049,432 A | * | 4/2000 | Machida et al. | 396/349 |
| 6,208,809 B1 | * | 3/2001 | Kanai et al. | 396/349 |
| 6,256,458 B1 | * | 7/2001 | Iwasa | 396/349 |
| 6,437,924 B1 | * | 8/2002 | Azegami | 396/349 |
| 6,469,840 B2 | * | 10/2002 | Nomura et al. | 396/349 |
| 6,483,994 B2 | * | 11/2002 | Kabe et al. | 396/349 |
| 2003/0007796 A1 | * | 1/2003 | Nomura et al. | 396/72 |

FOREIGN PATENT DOCUMENTS

JP          2001-100083 A          4/2001

* cited by examiner

Primary Examiner—Christopher Mahoney
(74) Attorney, Agent, or Firm—Birch, Stewart, Kolasch & Birch, LLP

(57) ABSTRACT

The lens device is capable of preventing a guide member from being disengaged from a guide groove with a simple construction, in which a projecting thread portion is formed on a sidewall of the guide groove for guiding a lens barrel in a straight motion and a recessed thread portion to be engaged with the projecting thread portion is formed on a sidewall of the guide member that is guided by the guide groove. A straight guide groove along the optical axis is formed on an inner peripheral surface of a first lens barrel, and a straight guide projection that is guided by the straight guide groove is formed on a second lens barrel. On a sidewall of the straight guide groove, a projecting thread portion is formed and on a sidewall of the straight guide projection, a recessed thread portion to be engaged with the projecting thread portion is formed.

23 Claims, 6 Drawing Sheets

LENS DEVICE

BACKGROUND OF THE INVENTION

1. Field of the Invention

The present invention relates to a lens device, and in particular relates to a lens device used for a collapsible camera having a zoom function.

2. Description of the Related Art

A cam mechanism is known as a device which moves a lens holding member for holding a moving lens in a zoom lens device along an optical axis. The cam mechanism is composed of a cam follower projecting and provided on an outer peripheral surface of the lens holding member, a cam groove formed on an inner peripheral surface of a cam barrel to be engaged with the cam follower, and a straight guide for stopping the rotation of the lens holding member and guiding the lens holding member in moving straight. The lens moves straight along the optical axis by a displacement in the cam groove along the optical axis by rotation of the cam barrel.

There are various mechanisms for the straight guide for guiding the lens holding member in straight motion, including a mechanism with a construction for guiding a lens holding member by engaging a cam follower with a guide groove formed on the inner peripheral surface of a fixed barrel, and a mechanism with a construction for guiding a lens holding member by engaging a slider formed on the lens holding member with a guide bar disposed along the optical axis.

The present inventor has proposed a construction in Japanese Patent Application Publication No. 2001-100083 published on Apr. 13, 2001, in which an arm is provided on a tip of a rear lens group holding member, and a projection formed on the tip of the arm is engaged with a straight guide groove formed on the inner peripheral surface of a front lens group holding member to be guided.

However, with the above-described construction, because the straight guide groove is provided on the front lens group holding member, if a pressing impact is applied to the front lens group holding member when, for example, the camera drops, a twisting force is applied to the arm and straight guide groove by the cam, thus causing a possibility that the projection disengages from the straight guide groove. In particular, in recent years, there are requests for more compact lens devices, and therefore, the lens holding member with less wall thickness is used for constituting the lens device. This limits the depth of the groove, and there has been a possibility of disengagement of the projection from the groove even on a small impact.

SUMMARY OF THE INVENTION

The present invention has been developed in view of the above-described circumstances, and its object is to provide a lens device with a simple configuration that is able to prevent a guide member from being disengaged from a guide groove for guiding a lens holding member in moving straight.

In order to achieve the above-described object, the present invention is directed to a lens device, comprising: a lens holding member that holds a lens, a guide groove parallel to an optical axis being formed on a peripheral surface of the lens holding member; and a guide member engaged with the guide groove of the lens holding member, the guide member movably guiding the lens holding member along the optical axis, wherein a projecting thread portion is formed on a sidewall of the guide groove along the direction of the optical axis, and a recessed thread portion to be engaged with the projecting thread portion of the guide groove is formed on the guide member.

The present invention is also directed to a lens device, comprising: a lens holding member that holds a lens, a guide groove parallel to an optical axis being formed on a peripheral surface of the lens holding member; and a guide member engaged with the guide groove of the lens holding member, the guide member movably guiding the lens holding member along the optical axis, wherein a recessed thread portion is formed on a sidewall of the guide groove along the direction of the optical axis, and a projecting thread portion to be engaged with the recessed thread portion of the guide groove is formed on the guide member.

According to the present invention, the projecting thread portion or the recessed thread portion provided on the guide groove is engaged with the recessed thread portion or the projecting thread portion provided on the guide member; therefore, even if a twisting force is applied to the guide member and the guide groove, the guide member is not disengaged from the guide groove.

Preferably, a tip side portion and a base side portion of the guide member which are oppositely placed with respect to the recessed thread portion of the guide member are formed to have the same widths. Hence, strength of the guide member is not reduced even if the recessed thread portion is formed on the guide member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereinunder preferred embodiments will be described in detail for a structure of a lens device according to the present invention in accordance with the accompanying drawings.

Figure 1:
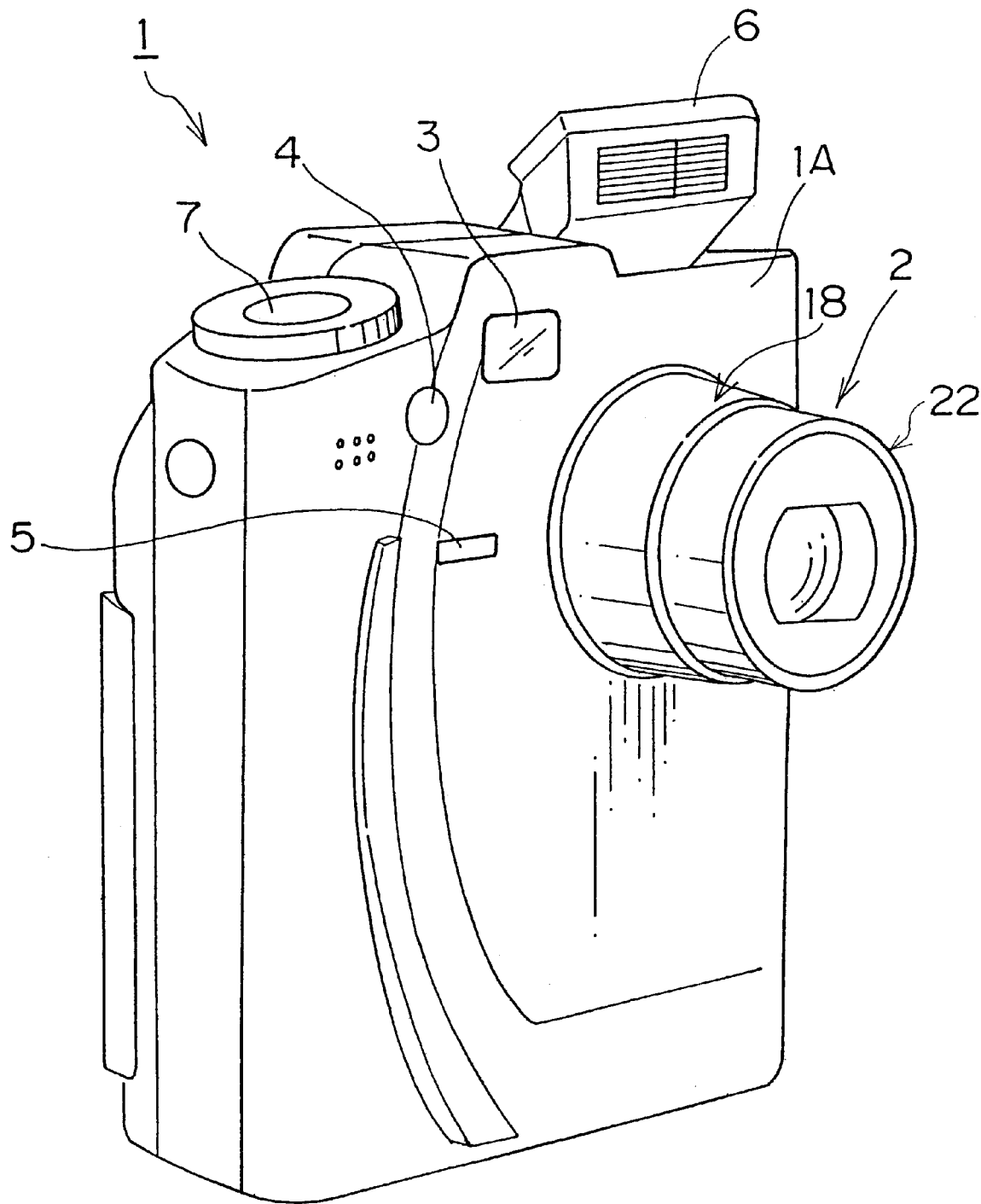
FIG. 1 is a perspective view showing an electronic still camera to which a lens device according to the present invention is applied.

FIG. 1 is an external view of an electronic still camera 1 to which a lens device according to the present invention is applied, a main body 1A of the electronic still camera 1 being formed into a rectangular box shape. A lens device 2, a finder window 3, a flash adjustment sensor 4 and a self-timer lamp 5 are provided in predetermined positions on the front face of the main body 1A. A pop-up flash 6 and a release switch 7 are provided on the top face of the main body 1A, and an eyepiece of the finder, a liquid crystal display panel, an operation key and the like which are not shown in the figure are provided in respective predetermined positions on the back face of the main body 1A. The lens device 2 is of a collapsible/extensible type, and a first lens barrel (the lens holding member) 18 and a shift barrel 22 are extended forward (in the direction of a subject) from the front face of the main body 1A only when in use.

Figure 2:
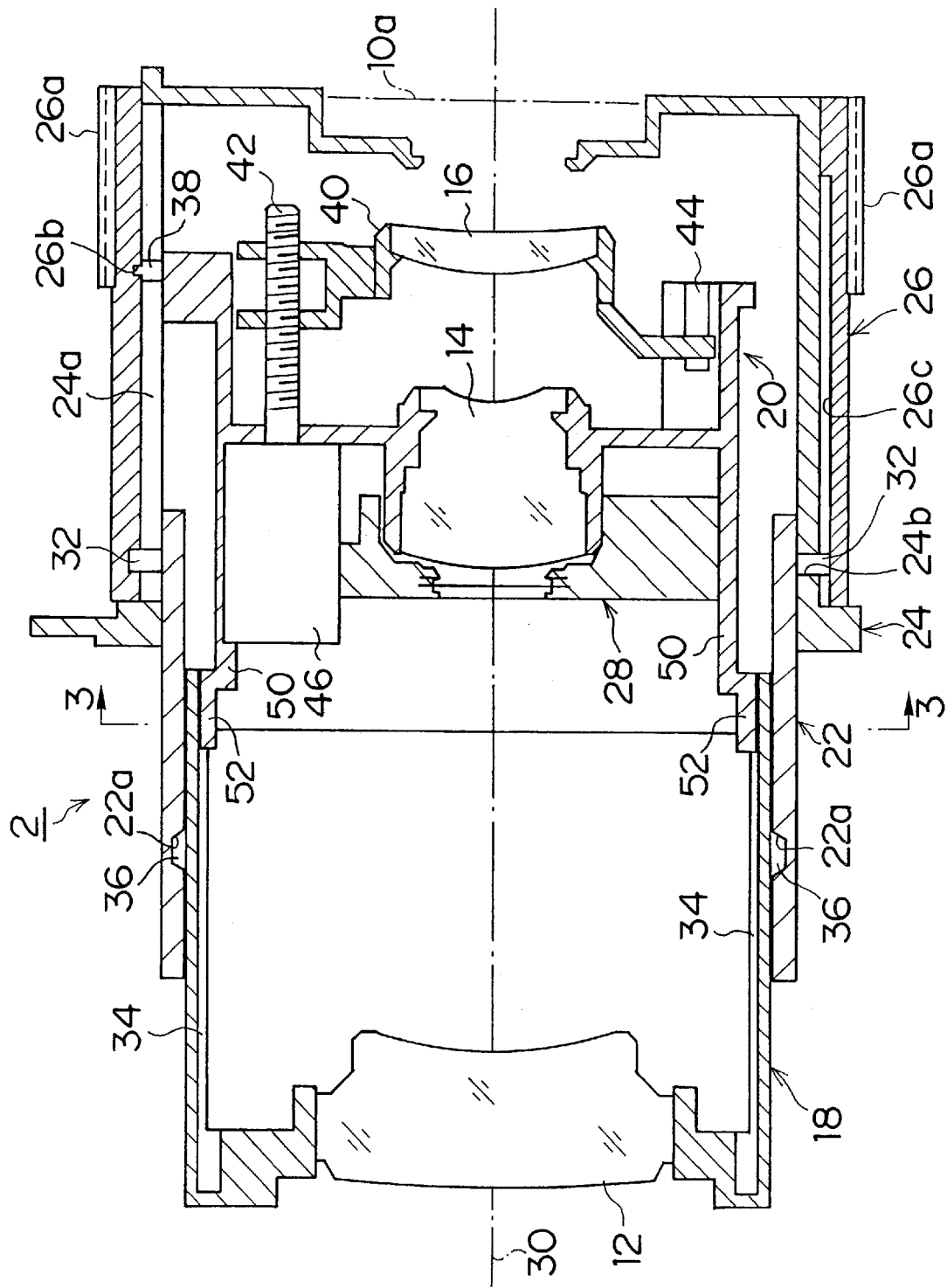
FIG. 2 is a cross-sectional view showing the lens device according to the present invention.

As shown in FIG. 2, the lens device 2 is mainly composed of a first lens 12, a second lens 14, a third lens 16, the first lens barrel 18, a second lens barrel 20, the shift barrel 22, a fixed barrel 24, a rotation barrel 26 and an aperture-setting shutter unit 28. On the outer periphery of the rotation barrel 26, a gear portion 26a is formed, to which the drive of a zoom motor (not shown in the figure) is transferred. The rotation barrel 26 is rotated in contact with the outer periphery of the fixed barrel 24 by transferring the drive from the zoom motor.

The state of the lens device 2 is changed from a collapsed position to a telescopic position by rotation of the rotation barrel 26 in "storage rotation area" between the "initial position" and the "middle position". It is further changed from the telescopic position to a wide position by rotation of the rotation barrel 26 in the "scaling rotation area" between the "middle position" and the "termination position".

On the inner peripheral surface of the rotation barrel 26, a second lens cam 26b for moving the second lens barrel 20 in the direction of an optical axis 30 and a shift-barrel straight guide groove 26c for guiding the shift barrel 22 in the direction of the optical axis 30 are formed. The shift-barrel straight guide groove 26c acts for providing rotational drive of the rotation barrel 26 for the shift barrel 22 and allowing the shift barrel 22 to move forward and backward in the direction of the optical axis 30.

On the fixed barrel 24, a second lens straight guide opening 24a for guiding straight the second lens barrel 20 in the direction of the optical axis 30 and a shift barrel cam 24b for moving the shift barrel 22 along the optical axis 30 are formed.

On the outer peripheral surface of the shift barrel 22, shift barrel cam followers 32 are provided. The shift barrel cam followers 32 engage with the shift barrel cam 24b and the shift-barrel straight guide groove 26c. The shift barrel 22 moves along the optical axis 30 with respect to the fixed barrel 24 while rotating in conjunction with the rotation of the rotation barrel 26. On the inner peripheral surface of the shift barrel 22, first lens cams 22a are provided. The shift barrel cam 24b, shift-barrel straight guide groove 26c and shift barrel cam followers 32 are provided in each of three-way split positions around the optical axis 30.

The first lens 12 is held inside the first lens barrel 18. Straight guide grooves 34 are provided on the inner peripheral surface of the first lens barrel 18 and first lens cam followers 36 that engage with the first lens cams 22a are provided on the outer peripheral surface of the first lens barrel 18. By action of straight guide by the second lens barrel 20 and action of the first lens cams 22a on the shift barrel 22, both caused by the rotation of the shift barrel 22, the first lens barrel 18 moves straight in the direction of the optical axis 30 with respect to the shift barrel 22. The first lens cam followers 36 and first lens cams 22a are provided in each of three-way split positions around the optical axis 30.

The second lens 14 is held inside the second lens barrel 20. On the outer peripheral surface of the second lens barrel 20, a second lens cam follower 38 is provided. The second lens cam follower 38 engages with the second lens cam 26b and the second lens straight guide opening 24a. The second lens barrel 20 moves straight in the direction of the optical axis 30 with respect to the fixed barrel 24 by rotation of the rotation barrel 26. The second lens cam follower 38, the second lens cam 26b and the second lens straight guide opening 24a are provided in each of three-way split positions around the optical axis 30.

The third lens 16 is held by a third lens frame 40. The third lens frame 40 is supported by the second lens barrel 20 via a lead screw 42 and a guide bar 44 so as to be movable in the direction of the optical axis 30. The third lens frame 40 is moved in the direction of the optical axis 30 in accordance with the lead by the lead screw 42 rotating by the drive of a focus motor 46. Reference character 10a indicates an imaging surface of the lens device 2.

Figure 3:
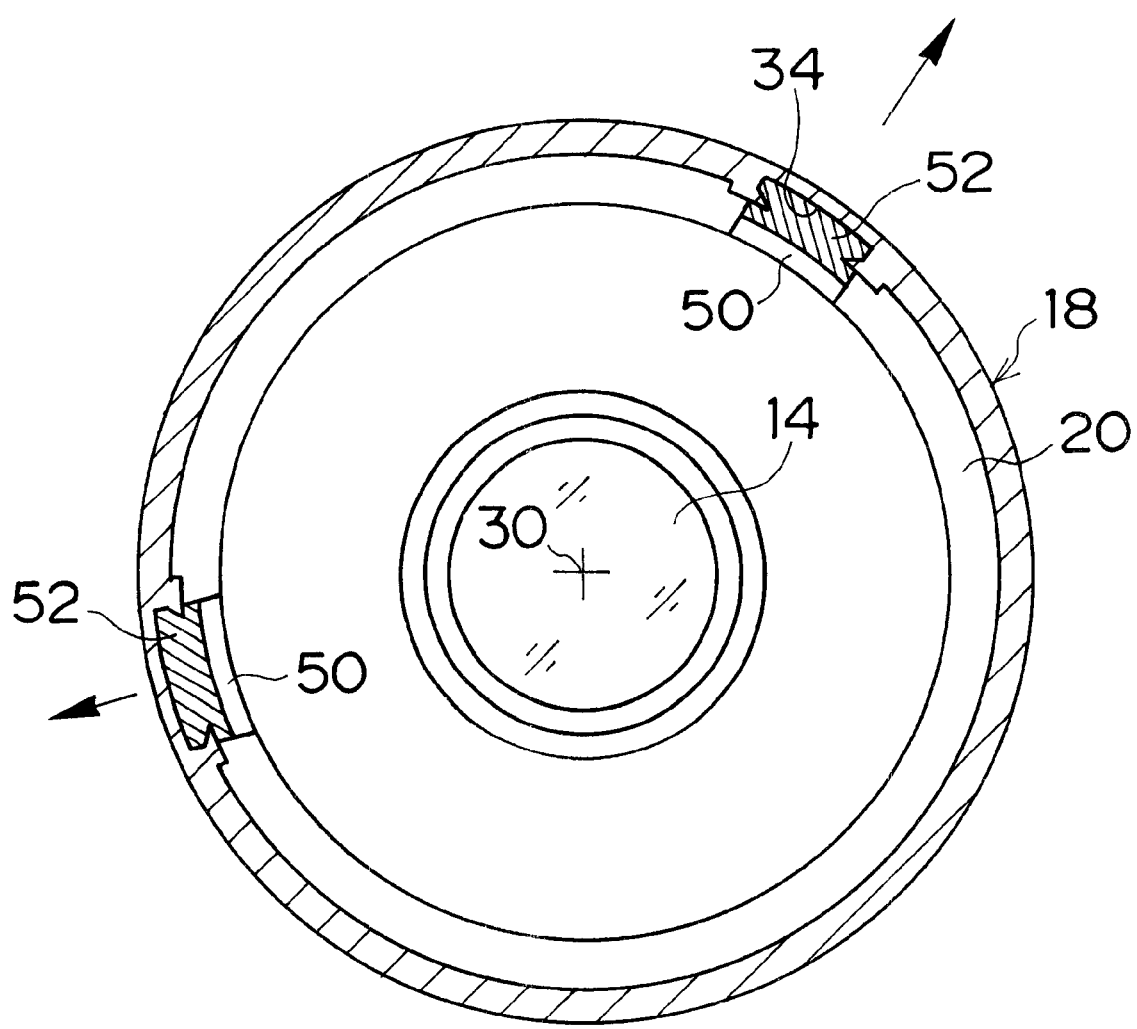
FIG. 3 is a cross-sectional view showing a first lens barrel and a second lens barrel taken along the line 3—3 in FIG. 2.

At the front end of the second lens barrel 20, arm portions 50, 50 are provided. As shown in FIG. 3, the arm portions 50, 50 are provided in two different positions, respectively, of the outer periphery of the second lens barrel 20. Each arm portion 50 is formed in a shape extending toward the subject from the front end of the second lens barrel 20 with a narrow width, the subject-side tip of the arm portion heading outward in the diameter direction of the barrel 20.

On the outer peripheral surface side of the tip of each arm portion 50, a straight guide projection (the guide member) 52 is provided. The straight guide projections 52, the arm portions 50 and the second lens barrel 20 are formed integrally by molding a material with elasticity such as plastic material. The straight guide grooves 34, the arm portions 50 and the straight guide projections 52 may be provided in each of three-way split positions around the optical axis 30.

Figure 4:
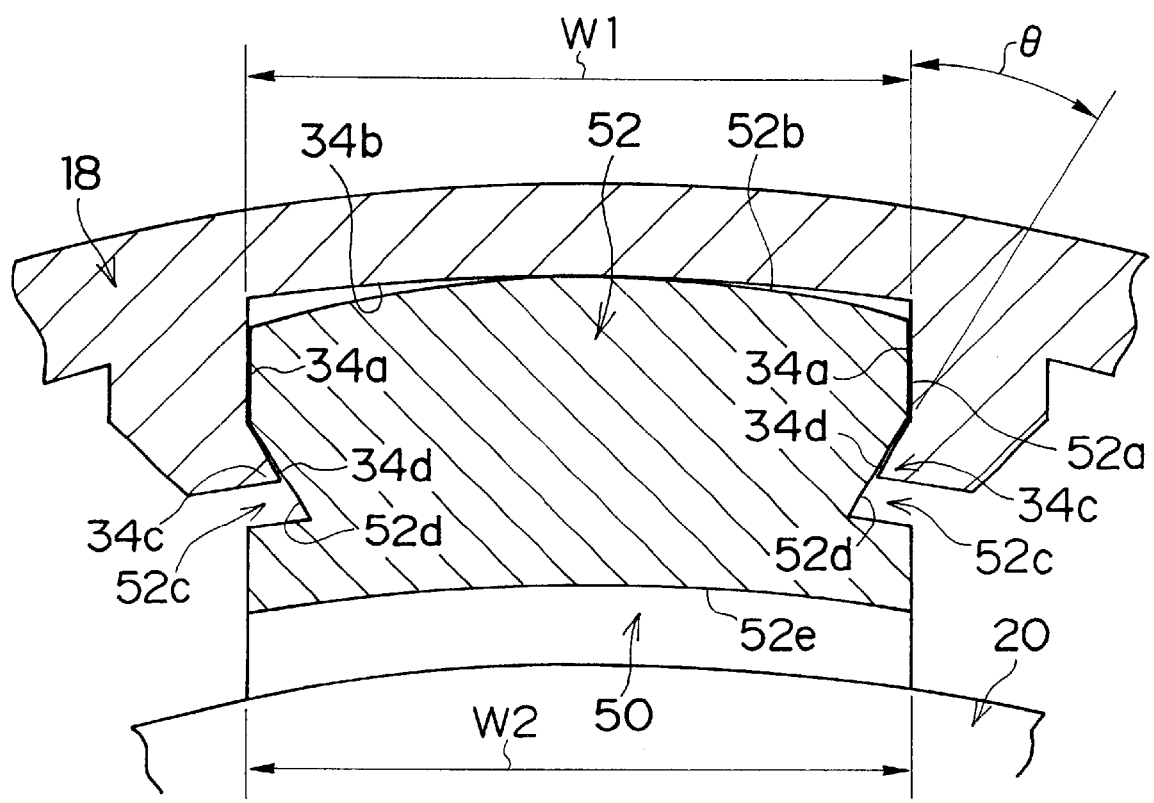
FIG. 4 is a cross-sectional view showing a straight guide projection and a straight guide groove shown in FIG. 3.

As shown in FIG. 4, both sidewalls 52a, 52a of the straight guide projection 52 are in contact with sidewalls 34a, 34a of the straight guide groove 34. Consequently, rotation of the straight guide projections 52 around the optical axis 30 in FIG. 3 is restricted. In other words, relative movement of the first lens barrel 18 with respect to the second lens barrel 20 around the optical axis 30 is restricted.

An outer peripheral surface 52b of the straight guide projection 52 shown in FIG. 4 is biased outward in the diameter direction by an elastic force of the arm portion 50 and made in contact with a bottom surface 34b of the straight guide groove 34. Consequently, the outer peripheral surface 52b of the straight guide projection 52 presses the bottom surface 34b of the straight guide groove 34, and therefore, the first lens barrel 18 and the second lens barrel 20 shown in FIG. 2 are supported so that optical axes of the first and second lenses are not inclined to each other.

Since the first lens barrel 18 and the second lens barrel 20 move so as to vary the spacing therebetween, the outer peripheral surface 52b of the straight guide projection 52 slides over the bottom surface 34b of the straight guide groove 34. Accordingly, if sliding parts are made in face-to-face contact with each other, a load is applied to the relative movement of the first lens barrel 18 and the second lens barrel 20 along the optical axis 30 and the rotation of the rotation barrel 26, thus causing a possibility of a scaling speed reduction. For reducing a sliding resistance, a cross-section of the outer peripheral surface 52c of the straight guide projection 52 along the optical axis 30 is formed in an arc shape, and a cross-section thereof in a direction orthogonal to the optical axis 30 is formed in an arc shape, that is, the outer peripheral surface 52b is formed spherically.

As shown in FIG. 4, recessed thread portions 52c, 52c are formed on the sidewalls 52a, 52a of the straight guide projection 52 in the direction of the optical axis 30 (see FIG. 2). The recessed thread portion 52c is provided in an approximate middle position of the sidewall 52a. In both sides of the straight guide protrusion 52 with respect to the recessed thread portion 52c, the outer peripheral surface 52b side (the tip side) with a width of W1 and the inner peripheral surface side 52e (the base side) with a width of W2 are respectively formed so that W1 and W2 are the same. The recessed thread portion 52c is formed so that the cross-section thereof has a triangular shape, and has a recessed surface 52d that is inclined θ° to the sidewall 52a. The angle θ of a projecting surface 34d and the recessed surface 52d is set to substantially 10° to substantially 40°, preferably 30°.

For the straight guide groove 34, projecting thread portions 34c, 34c are formed projecting from the sidewalls 34a, 34a, the projecting thread portions 34c, 34c being engaged with the recessed thread portions 52c of the straight guide projection 52. The projecting thread portions 34c are provided in the opening of the straight guide groove 34, along the optical axis 30 (see FIG. 2). The projecting thread portion 34c is formed so that the cross-section thereof has a triangular shape, and has the projecting surface 34d that is inclined θ° to the sidewall 34a.

If a twisting force generated, for example, when the lens device 2 drops, is applied to the straight guide projections 52 and the straight guide grooves 34 in the configuration described above, the recessed surface 52d of the straight guide projection 52 and the projecting surface 34d of the straight guide groove 34 are made in contact with each other, and, therefore, the straight guide projection 52 is not disengaged from the straight guide groove 34. Accordingly, the lens device 2 is not damaged even if it drops.

Moreover, since the projecting surface 34d and the recessed surface 52d are made in face-to-face-contact with each other, the twisting force applied to the straight guide projection 52 and the straight guide groove 34 does not concentrated on a single point, thereby preventing the straight guide projection 52 and the straight guide groove 34 from being deformed or damaged.

Since in the straight guide protrusion 52, the width W2 for the inner peripheral surface 52e and the width W1 for the outer peripheral surface 52b are the same, the straight guide projection 52 has high strength, and, therefore, it is not damaged. In addition, because the straight guide projection 52 is connected to the arm portion 50 through a wide area, the connecting part of the arm portion 50 and the straight guide projection 52 has high strength, thus preventing the connecting part from being deformed or damaged.

Figure 5:
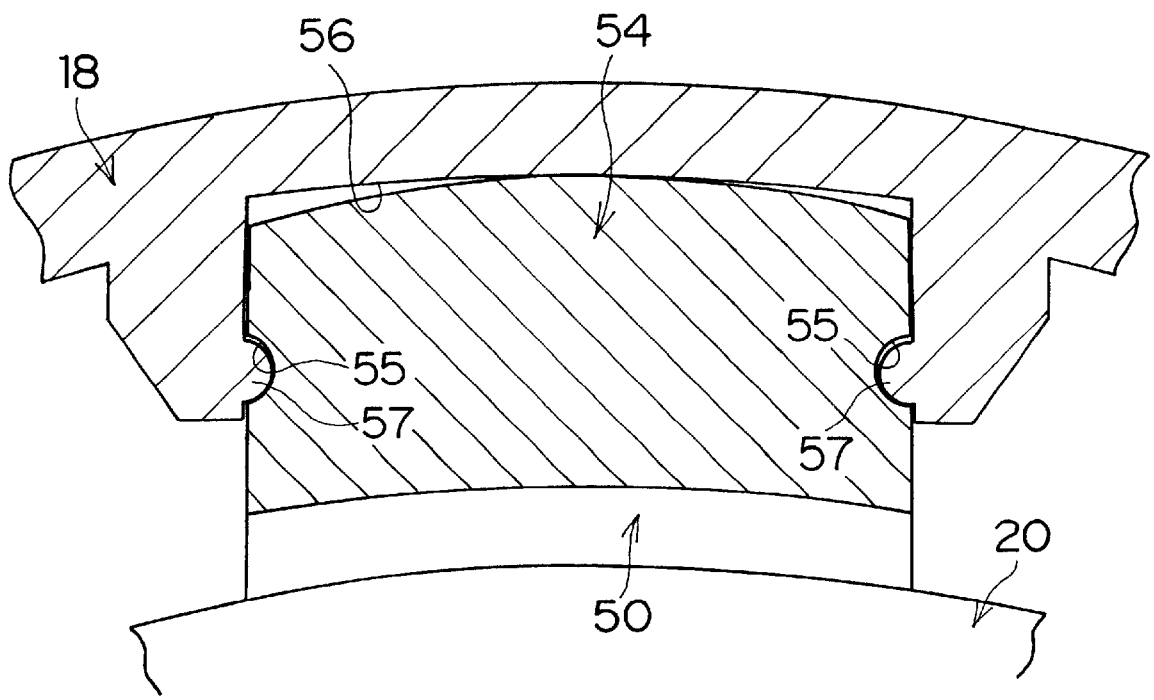
FIG. 5 is a cross-sectional view showing projecting thread portions and recessed thread portions differently shaped from those shown in FIG. 4.

The shape of the recessed thread portion 52c of the straight guide projection 52 or that of the projecting thread portion 34c of the straight guide groove 34 are not limited to the above-described embodiment. They may also be formed as shown in FIG. 5. On a straight guide projection 54 shown in the figure, recessed thread portions 55 with a half-round cross-section are formed, and on a straight guide groove 56, projecting thread portions 57 with a half-round cross-section are formed. The projecting thread portions 57 engage with the recessed thread portions 55, thus preventing the straight guide projection 54 from being disengaged from the straight guide groove 56.

Figure 6:
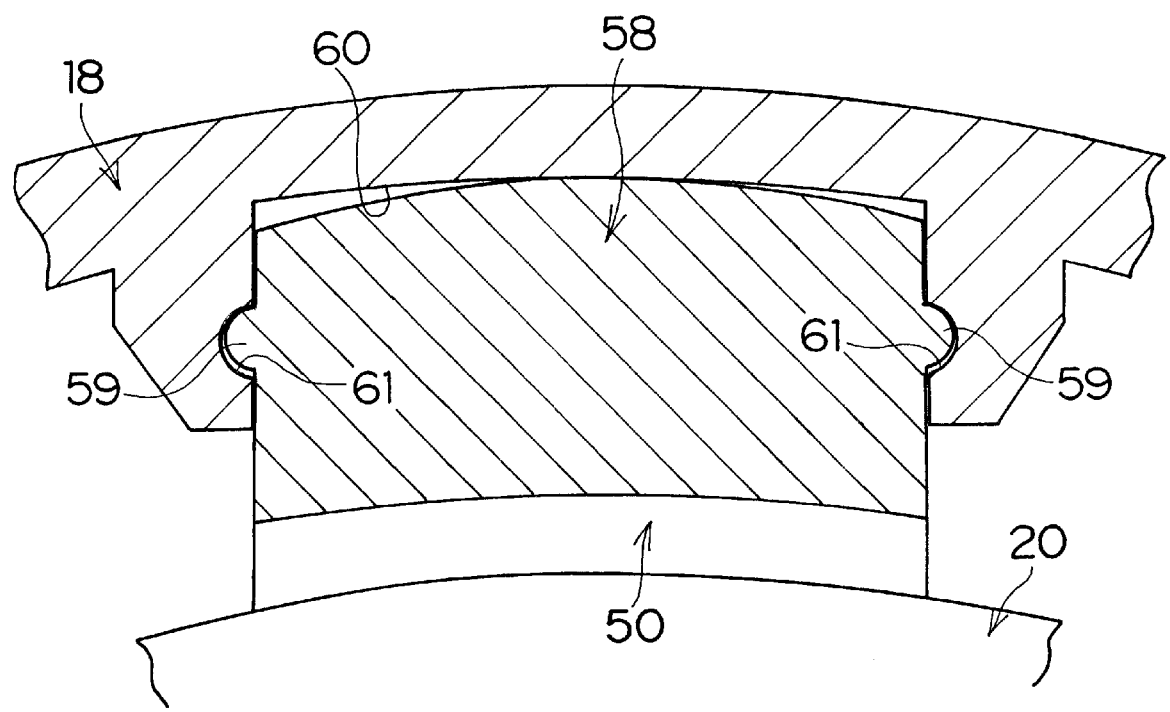
FIG. 6 is a cross-sectional view showing a straight guide projection and a straight guide groove having a different construction from those shown in FIG. 4.

Furthermore, as shown in FIG. 6, it may be possible to form projecting thread portions 59 on a straight guide projection 58 and to form recessed thread portions 61 on a straight guide groove 60. In this case, the projecting thread portions 59 also engage with the recessed thread portions 61, thus preventing the straight guide projection 58 from being disengaged from the straight guide groove 60.

As described so far, in the lens device according to the present invention, a guide groove is provided with projecting thread portions or recessed thread portions and a guide member is provided with recessed thread portions or projecting thread portions, and the projecting thread portions and the recessed thread portions are engaged with each other, and, therefore, the guide member is not disengaged from the guide groove even if a twisting force is applied to them.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens device, comprising:
   a lens holding member that holds a lens, a guide groove parallel to an optical axis being formed on a peripheral surface of the lens holding member; and
   a guide member engaged with the guide groove of the lens holding member, the guide member movably guiding the lens holding member along the optical axis,
   wherein a projecting thread portion is formed on a sidewall of the guide groove along the direction of the optical axis, and a recessed thread portion to be engaged with the projecting thread portion of the guide groove is formed on the guide member.

2. The lens device according to claim 1, wherein a tip side portion and a base side portion of the guide member which are oppositely placed with respect to the recessed thread portion of the guide member are formed to have the same widths.

3. The lens device of claim 1, wherein the rececessed thread portion of the guide member is formed substantially in a middle of a sidewall of the guide member.

4. The lens device of claim 1, wherein the rececessed thread portion of the guide member has a shape with at least one portion being substantially straight.

5. The lens device of claim 4, wherein the rececessed thread portion of the guide member is substantially triangular in shape.

6. The lens device of claim 5, wherein an angle of inclinination of the rececessed thread portion of the guide member substantially ranges from 10° and 40°.

7. The lens device of claim 1, wherein the rececessed thread portion of the guide member is substantially curved in shape.

8. The lens device of claim 7, wherein the rececessed thread portion of the guide member is a half-moon in shape.

9. The lens device of claim 1, wherein an outer peripheral surface of the guide member is shaped so as to reduce contact area between the outer peripheral surface of the guide member and the lens holding member.

10. The lens device of claim 9, wherein the outer peripheral surface of the guide member is an arc in shape.

11. A lens device, comprising:
    a lens holding member that holds a lens, a guide groove parallel to an optical axis being formed on a peripheral surface of the lens holding member; and
    a guide member engaged with the guide groove of the lens holding member, the guide member movably guiding the lens holding member along the optical axis, wherein a recessed thread portion is formed on a sidewall of the guide groove along the direction of the optical axis, and a projecting thread portion to be engaged with the recessed thread portion of the guide groove is formed on the guide member.

12. The device of claim 11, wherein widths of inner and outer peripheral surfaces of the guide member are substantially equal.

13. The lens device of claim 11, wherein the projecting thread portion of the guide member is formed substantially in a middle of a sidewall of the guide member.

14. The lens device of claim 11, wherein the projecting thread portion of the guide member is substantially curved in shape.

15. The lens device of claim 14, wherein the projecting thread portion of the guide member is a half-moon in shape.

16. The lens device of claim 11, wherein an outer peripheral surface of the guide member is shaped so as to reduce contact area between the outer peripheral surface of the guide member and the lens holding member.

17. The lens device of claim 16, wherein the outer peripheral surface of the guide member is an arc in shape.

18. A method to form a lens device, comprising:
  forming a lens holding member including a guide groove parallel to an optical axis on a peripheral surface of the lens holding member, wherein the guide groove includes one of a projecting thread portion and a recessed thread portion in a side wall of the guide groove; and
  forming a guide member including a thread portion parallel to the optical axis on a sidewall of the guide member, wherein the thread portion of the guide member engages the one of the projecting thread portion and the recessed thread portion in the side wall of the guide groove.

19. The method of claim 18, wherein the lens holder is movably guided by guide the member.

20. The method of claim 18, wherein the step of forming the guide member includes forming widths of inner and outer peripheral surfaces of the guide member to be substantially equal.

21. The method of claim 18, wherein the thread portion on the sidewall of the guide member is a projecting thread portion when the guide groove of the lens holder includes the recessed thread portion and the thread portion on the sidewall of the guide member is a recessed thread portion when the guide groove of the lens holder includes the projecting thread portion.

22. The method of claim 18, wherein the step of forming the guide member includes forming the one of the the thread portion of the guide member substantially in a middle of the sidewall of the guide member.

23. The method of claim 18, wherein forming the guide member includes shaping an outer peripheral surface of the guide member so as to reduce contact area between the outer peripheral surface of the guide member and the lens holding member.

* * * * *